United States Patent
Venkataramani et al.

(10) Patent No.: US 9,570,934 B2
(45) Date of Patent: Feb. 14, 2017

(54) LITHIUM BATTERY AUTO-DEPASSIVATION SYSTEM AND METHOD

(71) Applicant: HONEYWELL INTERNATIONAL INC., Morristown, NJ (US)

(72) Inventors: Nandagopal Venkataramani, Bangalore (IN); Gautham Ramamurthy, Bangalore (IN); Shine Hari, Tiruvalla (IN); Mohan Sreenivasan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 452 days.

(21) Appl. No.: 14/107,358

(22) Filed: Dec. 16, 2013

(65) Prior Publication Data
US 2015/0171655 A1    Jun. 18, 2015

(51) Int. Cl.
*H02J 7/00*        (2006.01)

(52) U.S. Cl.
CPC .................... *H02J 7/0075* (2013.01)

(58) Field of Classification Search
CPC ........................................ H02J 7/0075
USPC ................................ 320/131, 112
See application file for complete search history.

(56) References Cited

U.S. PATENT DOCUMENTS 4,839,248 A     6/1989 Magnussen, Jr. et al.
6,025,699 A *   2/2000 Cummings ............ H02J 7/0011
                                             320/112
6,118,251 A     9/2000 Atwater
2009/0323888 A1* 12/2009 Fukutome ............ G01C 22/006
                                             377/24.2

(Continued)

FOREIGN PATENT DOCUMENTS

EP    0444023 B1    1/1996
EP    0948828 B1    6/2001

(Continued)

OTHER PUBLICATIONS

Spectrum Batteries Inc., Depassivation, Dec. 3, 2010, p. 1, Also available at http://www.spectrumbatteries.com/id7.html.*

*Primary Examiner* — Drew A Dunn
*Assistant Examiner* — Zixuan Zhou
(74) *Attorney, Agent, or Firm* — Conley Rose, P.C.; Kristin Jordan Harkins

(57) ABSTRACT

A battery depassivation system includes a depassivation circuit, a battery connect/disconnect circuit, and a processor. The depassivation circuit is adapted to be electrically coupled in series with a battery. The depassivation circuit is also coupled to receive an ENABLE signal and is configured, upon receipt thereof, to draw current from the battery. The battery connect/disconnect circuit is adapted to be electrically coupled in series between the battery and one or more battery-powered electronic circuits. The battery connect/disconnect circuit is coupled to receive an ISOLATE signal and is configured, upon receipt thereof, to electrically disconnect the one or more battery-powered electronic circuits from the battery. The processor is adapted to couple to the battery and is configured, upon being coupled thereto, to determine if the battery needs depassivation and implement a depassivation routine if the battery is determined to need depassivation.

19 Claims, 2 Drawing Sheets

(56) References Cited

U.S. PATENT DOCUMENTS

2010/0085012 A1* 4/2010 Cruise ................ H01M 10/441
                                                    320/134
2012/0265264 A1* 10/2012 Vaisnys ................ A61N 1/3975
                                                    607/6
2012/0280830 A1   11/2012 Heath

FOREIGN PATENT DOCUMENTS

| EP | 2555294 A1 | 2/2013 |
| EP | 2573849 A1 | 3/2013 |
| WO | 8906868 A1 | 7/1989 |

* cited by examiner

LITHIUM BATTERY AUTO-DEPASSIVATION SYSTEM AND METHOD

TECHNICAL FIELD

The present invention generally relates to depassivation of lithium batteries, and more particularly relates to a system and method for auto-depassivation of lithium batteries.

BACKGROUND

Many devices, including most hand-held wireless devices, use one or more batteries as the electric power source. One popular type of battery that is used is a lithium battery, such as a lithium thionyl chloride battery, due to its relatively high energy density and low self-discharge rate. The low self-discharge rate allows lithium batteries to exhibit a longer shelf life as compared to various other battery types.

The main reason that lithium batteries have such a low self-discharge is that a protective layer is formed on these batteries during periods of non-use (e.g., storage). This protective layer begins forming during the manufacturing process, as soon as the electrolyte comes into contact with the lithium anode. The protective layer consists of lithium chloride crystals, and as it grows it prevents further reaction. This protective layer formation phenomenon is generally referred to as "passivation," and is most significantly observed when freshly manufactured batteries are stored for an extended period of time, such as 3 months or more. The protective layer formation can also be accelerated by environmental factors.

Although passivation is responsible for the relatively low self-discharge rate of lithium batteries, it also causes certain drawbacks. For example, passivation may also increase the internal resistance of the battery. This increased internal resistance may cause the battery to not respond to peak pulse current requirements for certain functions, such as wireless transmission. This can, in some instances, render the product unusable.

It is generally known that applying a current drain to a lithium battery will breakdown the protective layer. During a current drain, lithium ion movement is increased, which disturbs the ionic lattice of the protective layer, eventually breaking it down. This process is called "depassivation." The challenge in depassivation is to not load the battery, while effectively depassivating it. Presently known methods thus rely on separate depassivation devices that require removal of the batteries from the end-use device and/or various other costly and/or labor intensive methods.

Hence, there is a need for a system and method of depassivating a lithium battery that does not rely on separate depassivation devices and/or removal of the batteries from the end-use device and/or that is not costly and/or labor intensive. The present invention addresses one or more of these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a battery depassivation system includes a depassivation circuit, a battery connect/disconnect circuit, and a processor. The depassivation circuit is adapted to be electrically coupled in series with a battery. The depassivation circuit is also coupled to receive an ENABLE signal and is configured, upon receipt thereof, to draw current from the battery. The battery connect/disconnect circuit is adapted to be electrically coupled in series between the battery and one or more battery-powered electronic circuits. The battery connect/disconnect circuit is coupled to receive an ISOLATE signal and is configured, upon receipt thereof, to electrically disconnect the one or more battery-powered electronic circuits from the battery. The processor is adapted to couple to the battery and is configured, upon being coupled thereto, to determine if the battery needs depassivation and implement a depassivation routine if the battery is determined to need depassivation. The depassivation routine includes supplying the ENABLE signal and the ISOLATE signal.

In another embodiment, a method of operating a circuit that has a battery coupled to a depassivation circuit and to one or more battery-operated electronic circuits includes measuring battery voltage while the battery is electrically connected to the one or more battery-operated electronic circuits to determine if the battery needs to be depassivated. A depassivation routine is implemented if the battery needs to be depassivated. The depassivation routine includes stopping the battery from supplying electric current to the one or more battery operated circuits from the battery, drawing electrical current from the battery through the depassivation circuit, and measuring battery voltage while current is flowing through the depassivation circuit.

Furthermore, other desirable features and characteristics of the depassivation system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
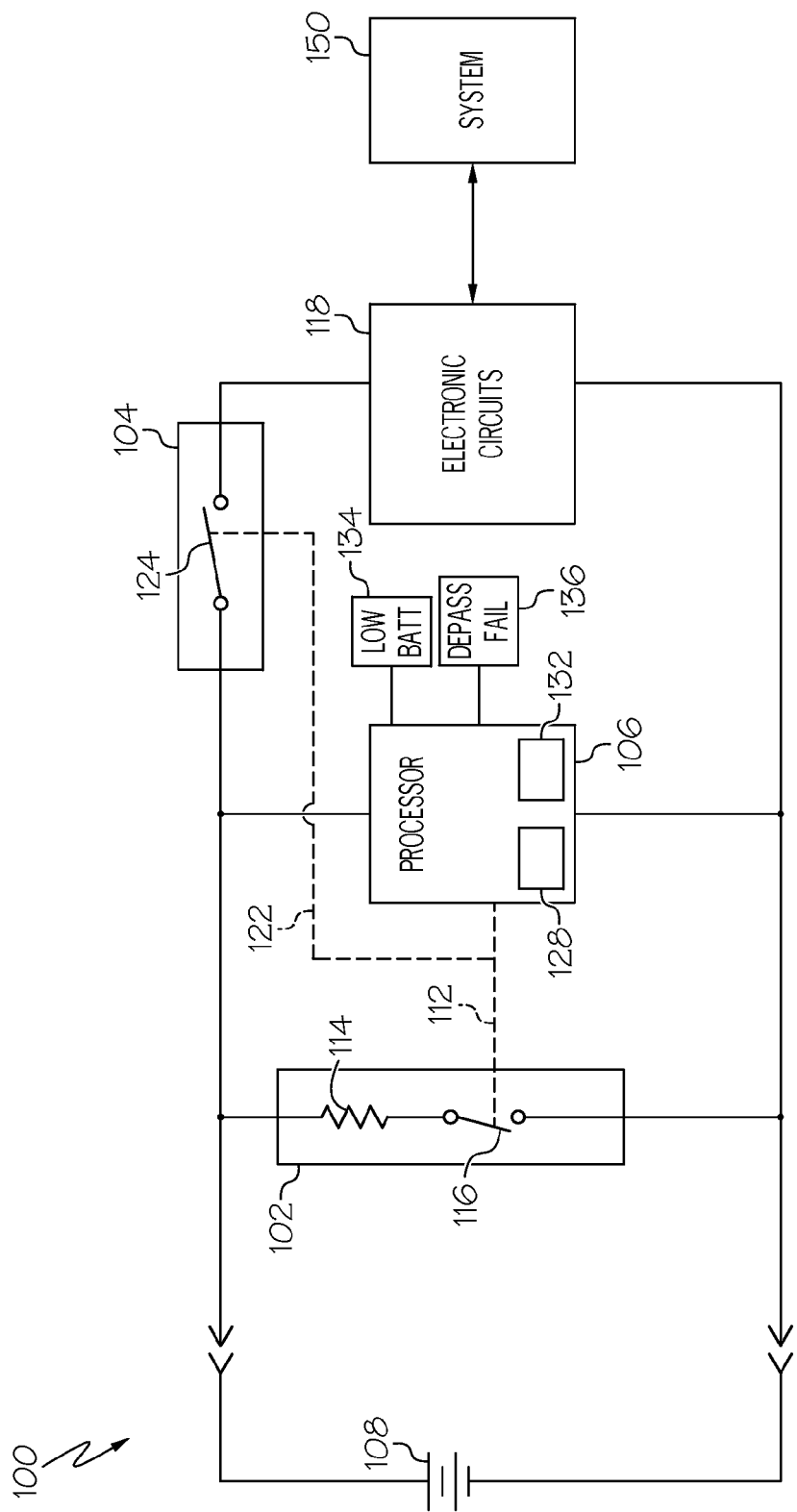
FIG. 1 depicts a functional block diagram of one embodiment of a battery depassivation circuit.

Referring to FIG. 1, a functional block diagram of a battery depassivation circuit 100 is depicted. The depicted circuit 100 includes a depassivation circuit 102, a battery connect/disconnect circuit 104, and a processor 106. The depassivation circuit 102 is electrically coupled in series with a battery 108, which is preferably a lithium battery, such as a lithium thionyl chloride battery or the like. The depassivation circuit 102 is additionally coupled to receive an ENABLE signal 112 and is configured, upon receipt of the ENABLE signal 112, to draw current from the battery 108.

The depassivation circuit 102 may be variously configured and implemented. In the depicted embodiment, however, the depassivation circuit 102 includes a resistance 114 and a first controllable switch 116. The resistance 114 may be implemented using one or multiple resistors to exhibit a desired value of electrical resistance. In one particular embodiment, the resistance 114 is implemented using a single 18-ohm resistor. Though, again, this may vary. The first controllable switch 116 is responsive to the ENABLE signal 112 and may also be variously implemented. For example, it may be implemented using any one of numerous types of bipolar transistors or any one of numerous types of field-effect transistors. In one particular embodiment, the controllable switch 116 is implemented using a metal-oxide semiconductor field effect transistor (MOSFET).

The battery connect/disconnect circuit 104 is electrically coupled in series between the battery 108 and one or more battery-powered electronic circuits 118. The battery connect/disconnect circuit 104 is additionally coupled to receive an ISOLATE signal 122 and is configured, upon receipt thereof, to electrically disconnect the one or more battery-powered electronic circuits 118 from the battery 108. The battery connect/disconnect circuit 104 may also be variously configured and implemented. In the depicted embodiment, the battery connect/disconnect circuit 104 includes a second controllable switch 124 that is responsive to the ISOLATE signal 122. The second controllable switch 124 may be implemented using any one of numerous types of bipolar transistors or any one of numerous types of field-effect transistors. In one particular embodiment, the controllable switch 124 is also implemented using a MOSFET.

The processor 106 is also coupled to the battery 108 and is configured, upon being coupled to the battery 108, to implement various functions. These functions include determining if the battery 108 has been removed and replaced, determining if the presently installed battery 108 needs to be replaced, determining if the battery 108 needs depassivation and, if it needs depassivation, to implement a depassivation routine. The manner in which the processor 106 implements these various functions will be described momentarily. Before doing so, however, it is noted that the processor 106 is also configured to selectively supply the above-described ENABLE and ISOLATE signals 112, 122. In the depicted embodiment, these signals 112, 122 are actually the same signal. In other embodiments, however, the processor 106 may be configured to supply separate ENABLE and ISOLATE signals 112, 122, which is why these signals are separately named herein.

The processor 106 is configured to detect battery removal and replacement via memory 128 and a RTC (real time clock) 132. The memory 128 and RTC 132 may be implemented as part of the processor 106, as in the depicted embodiment. Alternatively, one or both may be implemented separate from, and then coupled to, the processor 106. Regardless of the specific implementations, the processor 106, upon installation of the battery 108, does two things. It increments a count value in the memory 128 and starts the RTC 132. For example, when a battery 108 is installed for the very first time, the count value in the memory 128 is incremented to "1." When that battery 108 is removed and replaced, the count value is incremented to "2," and so on.

The RTC 132, upon being initiated, continues to tick until the battery 108 either is removed or fails. Upon removal or failure, the RTC 132 stops and the last time to which it ticked is stored in the memory 128. Thereafter, when a new battery 108 is installed, the RTC 132 is again initiated, commencing with the last ticked time that was stored in memory 128. In addition, the circuit 100 is preferably configured to communicate, via either a wired or wireless connection, to an external system or network 150 that tracks a system/network time. The system/network time is compared with the RTC time 132 to determine how long the circuit 100 had been de-energized.

As the battery 108 discharges and nears the end of its useful life, battery voltage will drop. The processor 106 is additionally configured to sense the battery voltage and, if it drops below a predetermined voltage threshold, the processor 106 will generate a low battery alert 134. Upon generating the low battery alert 134, which may be visual, audible, tactile, or various combinations thereof, the processor 106 stores the time that the low battery alert 134 occurred in memory 128, and determines the time remaining before the battery 108 must be replaced. Normally, the battery 108 should be replaced within 2-4 weeks of a low battery alert 134. It will be appreciated that the predetermined voltage threshold may vary. In one embodiment, in which the nominal voltage of the battery 108 is 6.5 volts, the predetermined threshold voltage is a voltage less than 6.0 volts, such as, for example, 5.5 volts.

After the battery 108 has been installed, the processor 106 is configured to determine if it needs to be depassivated. As is generally known, the thickness of the passivation film that forms on the anode of the battery 108 depends on the storage length and conditions. Concomitantly, the battery voltage, when the battery 108 is electrically loaded, also varies with storage length and conditions. Thus, after the battery 108 is installed, it is electrically loaded and its voltage is checked to determine if the battery 108 needs depassivation. The manner in which this occurs will now be described.

The processor 106 determines if the battery 100 needs depassivation by automatically supplying the ENABLE and ISOLATE signals 112, 122, whenever a battery 108 is installed. This causes the first controllable switch 116 to close and the second controllable switch 124 to open. As a result, battery current flows through the resistor 114 and the first controllable switch 116, while the one or more battery-powered electronic circuits 118 are electrically disconnected from the battery 108. As the depassivation circuit 102 is drawing current from the battery 108, the processor 106 is monitoring the battery voltage and measuring the amount of time it takes for the battery voltage to rise to a predetermined voltage magnitude. If the battery voltage does not rise to the predetermined voltage magnitude in a predetermined detection time period, then the processor 106 determines that the battery 108 needs to be depassivated. It will be appreciated that the predetermined voltage magnitude and the predetermined detection time period may vary, and may depend, for example, on the particular battery type (and/or number of batteries). For example, in some embodiment the predetermined voltage magnitude is 6.5 volts and the predetermined detection time period is 10 seconds.

The processor 106 is additionally configured, upon determining that the battery 108 does indeed need depassivation, to implement a depassivation routine. The depassivation routine includes supplying both the ENABLE signal 112 and the ISOLATE signal 122 for a depassivation time period. This, again, causes battery current to flow through the depassivation circuit 102 (e.g., resistor 114 and first controllable switch 116), while electrically disconnecting the one or more battery-powered electronic circuits 118 from the battery 108. As current flows through the depassivation circuit 102, the processor 106 monitors the battery voltage.

The processor 106 is configured to initially run the depassivation routine for a first depassivation time. If the battery voltage rises to the predetermined voltage magnitude after the first depassivation time, then the processor 106 stops the depassivation routine. That is, the processor 106 stops supplying the ENABLE and ISOLATE signals 112, 122, which electrically disconnects the depassivation circuit 102 from the battery 108 and electrically connects the one or more battery-powered electronic circuits 118 to the battery 108. However, if the battery voltage does not rise to the predetermined voltage magnitude after the first depassivation time, then the processor 106 extends the depassivation routine so that its entire duration is a second depassivation time. If the battery voltage rises to the predetermined voltage magnitude after the second depassivation time, then the processor 106 stops the depassivation routine, otherwise the processor 106 extends the depassivation routine so that its entire duration is a third depassivation time. If, after the third depassivation time period, the battery voltage does not rise to the predetermined voltage magnitude, this indicates that the battery 108 cannot be depassivated (e.g., a "dead battery") and must be replaced. Preferably, the processor 106 is configured to generate a suitable alert, such as a depassivation failure alert 136, to indicate that the battery 108 could not be depassivated. This alert 136 may also be visual, audible, tactile, or various combinations thereof.

Before proceeding further, it is noted that the load current during the depassivation routine may vary. In the depicted embodiment the depassivation circuit 102 is configured such that the load current during the depassivation routine is approximately 3 times that of the nominal load current drawn by the one or more battery-powered electronic circuits 118. It is additionally noted that the durations of the first, second, and third depassivation times may also vary. In the depicted embodiment, the first, second, and third depassivation times are 15 seconds, 30 seconds, and 60 seconds. It will be appreciated that these times may vary based, for example, on the specific type of lithium battery 108 being depassivated. In this regard, the processor 106 may also be configured, via either software or hardware (e.g., one or more dip switches), to select the battery type.

Figure 2:
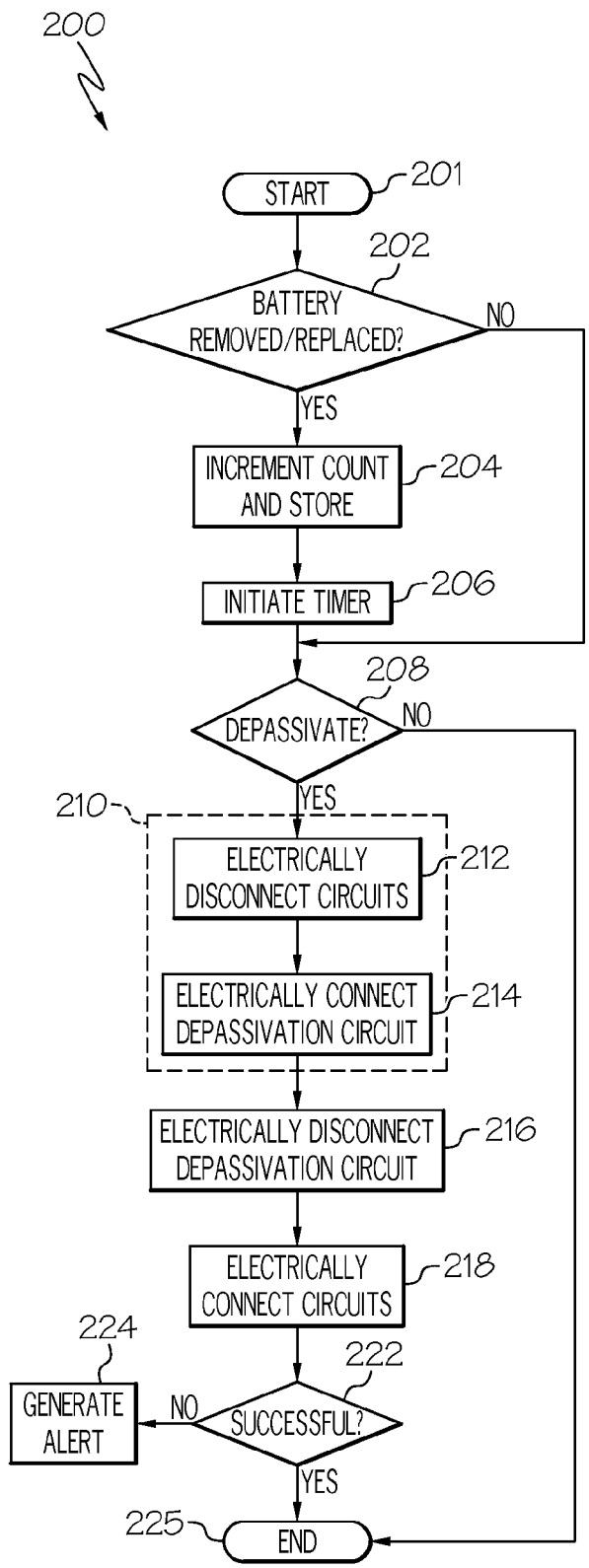
FIG. 2 depicts an embodiment of a process, in flowchart form, that may be implemented by the system of FIG. 1.

With reference now to FIG. 2, an embodiment of the overall process 200 that is implemented by the processor 106 is depicted in flowchart form, and will now be described. In doing so, it is noted that the reference numerals that are in parentheses in the following description correspond to like-numbered flowchart blocks in FIG. 2.

The process 200 is initiated (201) each time the circuit 100 is energized. Upon initiation, the processor 106 determines, using the methodology described above, if the battery 108 has been removed and replaced (202). If so, then the processor 106 increments the count value and stores the incremented value in the memory 128 (204). The processor 106 then initiates the start of the RTC 132 (206), and determines whether the battery 108 needs to be depassivated (208). If the battery 108 has not been removed and replaced, then the process 200 proceeds directly to the processor 106 determining whether the battery 108 needs to be depassivated (208).

If the processor 106 determines that the battery does not need to be depassivated, then the process 200 is terminated (225). On the other hand, if the processor determines that the battery does need to be depassivated, then the processor 106 initiates the above-described passivation routine (210). More specifically, the processor 106 supplies the ISOLATE signal 122 to electrically disconnect the one or more battery-powered electronic circuits 118 from the battery 108 (212), and supplies the ENABLE signal 112 to electrically connect the depassivation circuit 102 to the battery (214).

Upon completion of the depassivation routine (210), the processor 106 stops supplying the ENABLE and ISOLATE signals 112, 122 to electrically disconnect the depassivation circuit 102 from the battery 108 (216) and electrically connect the one or more battery-powered electronic circuits 118 to the battery 108 (218). The processor 106, as described above, then determines if the depassivation routine was successful (222). If so, then the process 200 terminates (225), if not, then a depassivation failure alert 136 is generated (224).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A battery depassivation system, comprising:
    a depassivation circuit adapted to be electrically coupled in series with a battery, the depassivation circuit coupled to receive an ENABLE signal and configured, upon receipt thereof, to draw current from the battery;
    a battery connect/disconnect circuit adapted to be electrically coupled in series between the battery and one or more battery-powered electronic circuits, the battery connect/disconnect circuit coupled to receive an ISOLATE signal and configured, upon receipt thereof, to electrically disconnect the one or more battery-powered electronic circuits from the battery, the one or more battery-powered electronic circuits are configured to draw current from the battery when electrically connected to the battery; and
    a processor adapted to couple to the battery and configured, upon being coupled thereto, to:
    (i) determine if the battery needs depassivation,
    (ii) implement a depassivation routine if the battery is determined to need depassivation, the depassivation routine comprising supplying the ENABLE signal and the ISOLATE signal, and
    (iii) if a measured battery voltage rises to a predetermined voltage magnitude within a first depassivation time during the depassivation routine, stop supplying the ENABLE signal and the ISOLATE signal.

2. The system of claim 1, wherein the processor is further configured to:
    measure the battery voltage;
    implement the depassivation routine for the first depassivation time; and
    determine if the measured battery voltage rises to the predetermined voltage magnitude after the first depassivation time while implementing the depassivation routine.

3. The system of claim 2, wherein, if the measured battery voltage does not rise to the predetermined voltage magnitude after the first depassivation time, the processor is further configured to:
    continue the depassivation routine for an entire duration of a second depassivation time; and
    determine if the measured battery voltage rises to the predetermined voltage magnitude after the second depassivation time.

4. The system of claim 3, wherein, if the measured battery voltage rises to the predetermined voltage magnitude after the second depassivation time, the processor is further configured to stop supplying the ENABLE signal and the ISOLATE signal.

5. The system of claim 4, wherein, if the measured battery voltage does not rise to the predetermined voltage magnitude after the second depassivation time, the processor is further configured to:
    continue the depassivation routine for an entire duration of a third depassivation time; and
    determine if the measured battery voltage rises to the predetermined voltage magnitude after the third depassivation time.

6. The system of claim 5, wherein, if the measured battery voltage does not rise to the predetermined voltage magnitude after the third depassivation time, the processor is further configured to generate an alert.

7. The system of claim 1, wherein:
    the one or more battery-powered electronic circuits are configured to draw a nominal current from the battery; and
    the depassivation circuit is configured, upon receipt of the ENABLE signal, to draw a depassivation current from the battery, the depassivation current greater than the nominal current.

8. The system of claim 7, wherein the depassivation current is about three times the nominal current.

9. The system of claim 1, wherein the processor is configured to determine if the battery needs depassivation by:
    supplying both the ENABLE signal and the ISOLATE signal for a predetermined detection time period;
    measuring battery voltage for the predetermined detection time period; and
    determining if the battery voltage reaches a predetermined voltage magnitude during the predetermined detection time period.

10. The system of claim 1, wherein the processor is further configured to determine if the battery has been replaced with a replacement battery.

11. The system of claim 10, wherein the processor is further configured implement a counter; and
    increment the counter upon installation of the replacement battery.

12. The system of claim 10, wherein the processor is further configured, upon determining that the battery has been replaced, to automatically detect if the replacement battery needs to be replaced.

13. The system of claim 1, wherein the processor is further configured to determine if the battery needs to be replaced.

14. A method of operating a circuit that has a battery coupled to a depassivation circuit and to one or more battery-operated electronic circuits, the method comprising the steps of:
measuring battery voltage while the battery is electrically connected to the one or more battery-operated electronic circuits to determine if the battery needs to be depassivated; and
implementing a depassivation routine if the battery needs to be depassivated, the depassivation routine comprising:
stopping the battery from supplying electric current to the one or more battery operated circuits from the battery,
drawing electrical current from the battery through the depassivation circuit,
measuring battery voltage while current is flowing through the depassivation circuit;
determining if the measured battery voltage rises to a predetermined voltage magnitude while drawing the electrical current from the battery through the depassivation circuit; and
stopping the depassivation routine if the measured battery voltage rises to the predetermined voltage magnitude within a first depassivation time.

15. The method of claim 14, further comprising:
implementing the depassivation routine for the first depassivation time; and
determining if the measured battery voltage rises to the predetermined voltage magnitude after the first depassivation time.

16. The method of claim 15, further comprising:
continuing the depassivation routine for an entire duration of a second depassivation time if the measured battery voltage does not rise to the predetermined voltage magnitude after the first depassivation time;
determining if the measured battery voltage rises to the predetermined voltage magnitude after the second depassivation time; and
stopping the depassivation routine if the measured battery voltage rises to the predetermined voltage magnitude after the second depassivation time.

17. The method of claim 16, further comprising:
continuing the depassivation routine for an entire duration of a third depassivation time if the measured battery voltage does not rise to the predetermined voltage magnitude after the third depassivation time;
determining if the measured battery voltage rises to the predetermined voltage magnitude after the third depassivation time; and
stopping the depassivation routine if the measured battery voltage does not rise to the predetermined voltage magnitude after the second depassivation time.

18. The method of claim 17, further comprising:
generating an alert if the measured battery voltage does not rise to the predetermined voltage magnitude after the third depassivation time.

19. The method of claim 14, further comprising;
discontinuing the depassivation routine;
electrically disconnecting the battery from the depassivation circuit; and
electrically reconnecting the battery to the one or more battery operated circuits.

* * * * *

UNITED STATES PATENT AND TRADEMARK OFFICE
CERTIFICATE OF CORRECTION

PATENT NO. : 9,570,934 B2  
APPLICATION NO. : 14/107358  
DATED : February 14, 2017  
INVENTOR(S) : Nandagopal Venkataramani et al.

It is certified that error appears in the above-identified patent and that said Letters Patent is hereby corrected as shown below:

Column 8, Line 61:
"configured implement" should be "configured to: implement"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*